Dec. 15, 1931.  E. BROWN  1,836,065
THRUST BEARING
Filed Aug. 16, 1927
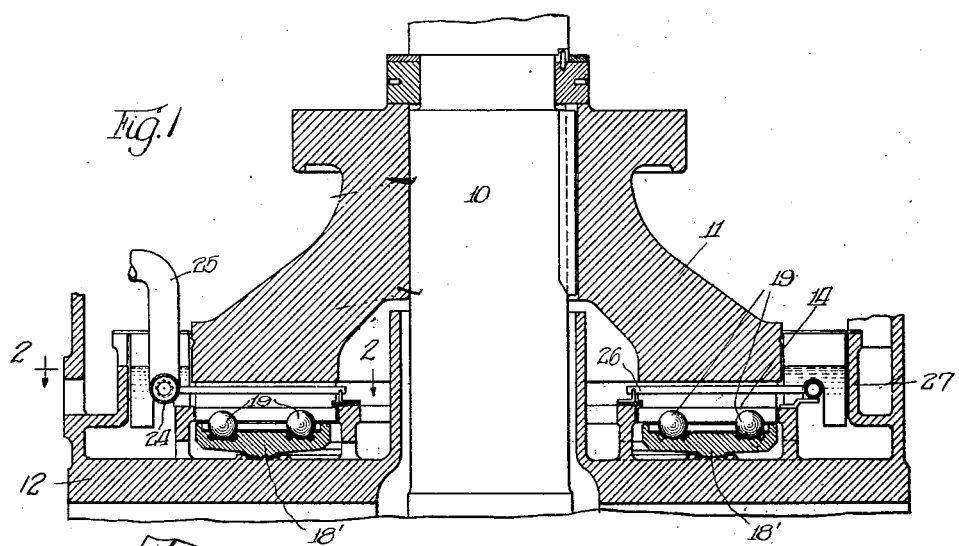
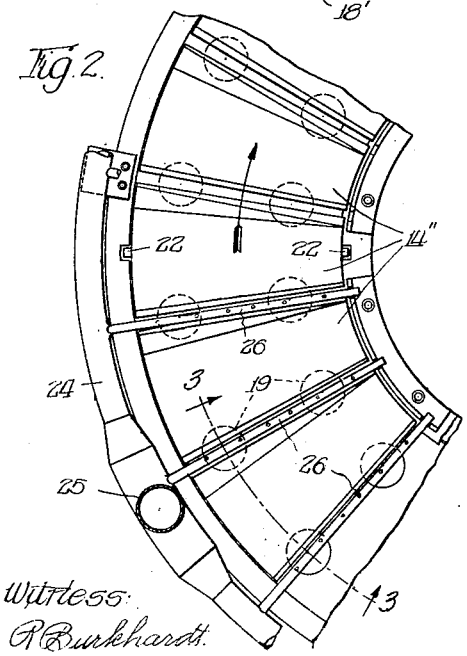
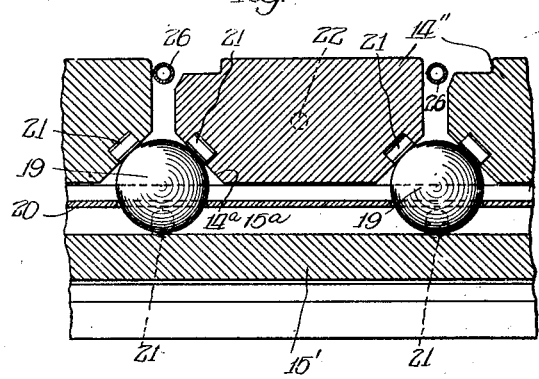
Inventor:
Eric Brown, Patented Dec. 15, 1931

1,836,065

UNITED STATES PATENT OFFICE

ERIC BROWN, OF BADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

THRUST BEARING

Application filed August 16, 1927, Serial No. 213,286, and in Germany August 18, 1926.

This invention relates to thrust bearings for supporting the thrust of rotary machine parts.

The general object of the invention is the provision of a bearing construction particularly adapted for taking extremely heavy loadings and maintaining uniform distribution or equalization of the bearing pressures over the surfaces of the cooperating stationary and rotating bearing members.

Another object is the provision of a construction which is relatively simple and extremely strong.

Another object is the provision of a construction which will attain proper lubrication of the cooperating bearing surfaces with certainty.

A further object is the provision of a construction which will minimize wear on the load supporting portions and also permit replacement of worn parts without requiring the scrapping of the entire bearing.

Other and further objects will be pointed out or indicated hereinafter, or will be apparent to one skilled in the art upon an understanding of the invention or its employment in practice.

In the drawings forming a part of this specification certain structural embodiments of the invention are shown, but it is to be understood that these are presented for purpose of illustration only, and are not to be interpreted in any fashion calculated to limit the claims short of the true and more comprehensive scope of the invention in the art, as it may take other structural forms differing in various features and details from those here shown.

In the drawings,

Fig. 1 is a section, taken longitudinally of the shaft, of a thrust bearing embodying the present improvements;

Fig. 2 is a part section, taken transversely of the shaft on line 2—2 of Fig. 1; and Fig. 3 is a detail in the nature of a developed section taken on line 3—3 of Fig. 2.

When very large axial bearing loads, sometimes amounting to many hundreds of tons, must be supported, as for example in the rotating parts of vertical shaft hydroelectric sets, the bearing surfaces must be of quite extensive area. As a result, any bending of the points of support causes excessive local strains to be set up, and thus the actual area of the bearing surface, as predetermined by calculation, is not properly utilized. The deflections caused by local overloading, resulting from such circumstances, are particularly harmful in their effects during the starting and stopping of the machine. It is very important, therefore, that in such bearings the stationary bearing surface should be constructed and supported in such a way that it cooperates in taking the load from the thrust collar over its entire area at all times, and to accomplish this the stationary bearing surface must be arranged to provide for automatic equalization of load over its entire surface in both radial and circumferential directions. The present invention provides for the accomplishment of this result by provision of a construction in which the member, or members constituting the thrust receiving member of the bearing are supported on a special supporting ring, sustained by the bearing frame, which ring is in a single piece, is flexible and is disposed approximately concentric with the shaft. On one side this ring receives the thrust at points which are spaced in a plane perpendicular to the shaft, and at the other side transmits the resultant of these thrusts to the bearing frame at points lying midway between the radially spaced points on which the thrust is received. The form of the structure by means of which the result is attained is that of an infinite number of levers, loaded at their ends and fulcrumed at intermediate points, about which intermediate points motion can take place by flecture of the ring.

The reference numeral 10 designates the shaft which carries the thrust collar 11, forming the rotating bearing member, and the numeral 12 designates the bearing frame which constitutes the portion which supports the thrust. The collar 11 rotates on and transmits the thrust to the stationary bearing member 14, which stationary bearing member is supported on the equalizing ring 15'. This may be circular or polygonal in contour, and is arranged concentric with the shaft 10. This ring while having the necessary stiffness to prevent its bending in the line of a radial section under the normal load, has sufficient resilient flexibility to permit its twisting to allow, in effect, a rocking movement of localized portions on the fulcrum 18'.

The stationary bearing member is made up of relatively movable sectors 14'' which support the thrust collar on their upper surfaces and are themselves supported on the flexible ring 15', through the medium of two concentric rows of balls 19. As best seen in Fig. 3, the lower sides of the sectors 14'' are chamfered at 14a and adjacent sectors have support on the same intermediately disposed balls. These balls are retained in annular grooves 15a in the flexible ring 15', being retained in proper relative spacing by a cage member 20. Specially hardened and replaceable inserts 21 are seated in the sectors and the ring to afford the bearing surfaces for contact with the balls 19. Cooperating stop members 22 on the sectors and the bearing frame prevent extensive travel of the former, but allow a limited extent of movement in the direction of rotation, so that equalizing adjustment as between different sectors can take place, the balls acting as equalizing members for transmitting this movement from one sector to another, and bringing about the adjustment in elevation of the sectors by virtue of their cooperation with the chamfered portions of the latter. The ring 15' has an amount of flexibility sufficient to permit its twisting to attain equalization in the radial directions, and the balls 19 function as the radially spaced points of support through which the thrust is transmitted to the ring. The ring is fulcrumed on the frame through the projection 18', so that it may take the rocking movement in a radial direction. It will be observed, therefore, that by virtue of this arrangement, equalization of the load over the entire bearing surface is maintained automatically at all times in both the radial and circumferential directions.

The bearing frame is encircled by a pipe 24 to which lubricant is supplied under pressure by way of the connection 25, and the pipe 24 supplies radially arranged distributing tubes 26, located between juxtaposed sectors. These distributing tubes are perforated to afford small upwardly directed orifices, through which the lubricant is ejected against the bearing surface of the thrust collar, and an oil flange 27 surrounds the bearing parts so as to maintain them immersed in lubricant.

The equalizing ring may be made of steel, preferably hardened spring steel.

I claim:

1. In a thrust bearing, a bearing frame, a rotary-bearing member, a thrust-receiving member cooperating with said rotary member, an annular member having a fulcrum supported on said frame, and balls for spacing said thrust-receiving member from said annular member, said balls being supported on said annular member on opposite sides of the fulcrum thereof.

2. In a thrust bearing, a bearing frame, a rotary-bearing member, a thrust-receiving member cooperating with said rotary member, an annular member having a fulcrum supported on said frame, balls for spacing said thrust-receiving member from said annular member, said balls being supported on said annular member on opposite sides of the fulcrum thereof, and means for maintaining said balls in relatively spaced arrangement.

3. In a thrust bearing, a bearing frame, a rotary-bearing member, a thrust-receiving member formed of relatively movable sections cooperating with said rotary member, an annular member having a fulcrum supported on said frame, balls for spacing said thrust-receiving member from said annular member, said balls being interposed in supporting relation between adjacent sections of said thrust-receiving member and on opposite sides of the fulcrum of said annular member.

4. In a thrust bearing, a bearing frame, a rotary-bearing member, a thrust-receiving member formed of relatively movable sections cooperating with said rotary member, each of said sections having beveled portions, an annular member having a fulcrum supported on said frame, and balls for spacing said thrust-receiving member from said annular member, said balls seating on the beveled portions of said sections in supporting relation between adjacent sections of said thrust-receiving member and on opposite sides of the fulcrum of said annular member.

5. In a thrust bearing, a bearing frame, a rotary-bearing member, a thrust-receiving member formed of relatively movable sections cooperating with said rotary member, each of said sections having beveled portions, an annular yieldable member having a fulcrum supported on said frame, balls for spacing said thrust-receiving member from said yieldable member, said balls seating on the beveled portions of said sections in supporting relation between adjacent sections of said thrust-receiving member and on opposite sides of the fulcrum of said yieldable member, and lubricant-distributing means for said balls disposed directly adjacent thereto.

In testimony whereof I have hereunto subscribed my name at Berne, Switzerland, this 4th day of August, A. D. 1927.

ERIC BROWN.